United States Patent [19]
Lazzari

[11] Patent Number: 6,098,270
[45] Date of Patent: Aug. 8, 2000

[54] PROCESS FOR PRODUCING A SLIDER HAVING COMPOSITE WELDING STUDS

[75] Inventor: Jean-Pierre Lazzari, Corenc, France

[73] Assignees: Commissariat a l'Energie Atomique, Paris; Silmag, Grenoble Cedex, both of France

[21] Appl. No.: 08/801,357

[22] Filed: Feb. 19, 1997

Related U.S. Application Data

[62] Division of application No. 08/668,321, Jun. 26, 1996, abandoned, which is a continuation of application No. 08/330,994, Oct. 28, 1994, abandoned.

[30] Foreign Application Priority Data

Oct. 29, 1993 [FR] France .................................. 93 12941

[51] Int. Cl.$^7$ ........................................................ G11B 5/42
[52] U.S. Cl. ........................ 29/603.06; 360/103; 360/104
[58] Field of Search ........................... 29/603.04, 603.05, 29/603.06; 360/103, 104

[56] References Cited

U.S. PATENT DOCUMENTS

| | | |
|---|---|---|
| 3,480,412 | 11/1969 | Duffek, Jr. et al. . |
| 3,765,590 | 10/1973 | Duffek et al. . |
| 3,859,715 | 1/1975 | Duffek et al. . |
| 3,947,867 | 3/1976 | Duffek et al. . |
| 4,761,699 | 8/1988 | Ainslie et al. . |
| 4,786,999 | 11/1988 | Tanaka et al. . |
| 4,789,914 | 12/1988 | Ainslie et al. . |

FOREIGN PATENT DOCUMENTS 0 265 720  5/1988  European Pat. Off. .

OTHER PUBLICATIONS

Patent Abstracts of Japan, vol. 17, No. 118 (P–1500), Mar. 11, 1993, JP–A–04 302 879, Oct. 26, 1992.
Patent Abstracts of Japan, vol. 15, No. 322 (P–1239), Aug. 16, 1991, JP–A–03 116 478, May 17, 1991.
Patent Abstracts of Japan, vol. 13, No. 329 (P–904), Jul. 25, 1989, JP–A–1 092 975, Apr. 12, 1989.

*Primary Examiner*—Carl E. Hall
*Attorney, Agent, or Firm*—Oblon, Spivak, McClelland, Maier & Neustadt, P.C.

[57] ABSTRACT

A slider incorporates welding studs for assembly with a spring arm. Each of the welding studs includes a base that is integral with the slider. The base has a controlled height and is made from a first material. Each of the welding studs further includes a meltable stud member which is placed on the base. The meltable stud member is made from a second material that has a melting point which is lower than that of the first material of the base.

4 Claims, 3 Drawing Sheets

PROCESS FOR PRODUCING A SLIDER HAVING COMPOSITE WELDING STUDS

TECHNICAL FIELD

This is a Division of application Ser. No. 08/668,321 filed on Jun. 26, 1996, which 1) is abandoned in favor of application Ser. No. 08/904,616 filed Aug. 1, 1997 and 2) is a continuation of application Ser. No. 08/330,994 filed on Oct. 28, 1994, abandoned.

The present invention relates to a slider having composite welding studs and to a production process. It is used in magnetic recording, particularly recording on a hard disk.

PRIOR ART

Magnetic head sliders are generally bonded to the end of an arm serving as a spring. The electrical connections between the head and the external circuits are provided by twisted conductor wires welded to the slider and supported by the arm.

In order to avoid the use of such wires, it is possible to use connection tracks formed on the upper face of the slider (i.e. the face opposite to the disk) and on the spring arm. In order to obtain the electrical connections, while ensuring the necessary welding and mechanical strength of the slider beneath the end of the arm, welding studs are formed between the tracks of the slider and those of the arm.

Thus, U.S. Pat. No. 4,789,914 describes an assembly shown in the attached FIG. 1. In the latter it is possible to see a slider 10 with connection tracks 12, the end 20 of a spring arm, together with a connection circuit 22 and, between them, the welding studs 24.

This means for fixing the slider beneath the arm suffers from the disadvantage of not ensuring a controlled spacing between the arm and the slider. Thus, under the pressure exerted by the spring arm, certain studs are crushed during the welding operation and the slider can come into contact with the arm, so that its mobility is impaired.

The object of the present invention is to obviate this disadvantage.

DESCRIPTION OF THE INVENTION

To this end, according to the invention each welding stud is of a composite nature in the sense that it comprises two parts, namely a first part or base, which is made from a material not meltable at the temperature at which welding takes place, said base having a certain controlled height ensuring a minimum spacing between the slider and the arm, and a second part constituted by a meltable material stud member, which will form the actual weld. Thus, even if the meltable stud members are crushed to a greater or lesser extent as a function of the planeity defects of the parts, the slider and the arm will still be spaced by a minimum distance equal to the height of the bases.

More specifically, the present invention relates to a slider having welding studs for an assembly with a spring arm, characterized in that each welding stud comprises on the one hand a base integral with the slider, said base having a controlled height and being made from a first material and on the other hand a meltable stud member located on the base, said meltable stud member being made from a second material having a lower melting point than the first material.

The first material is advantageously a conductive material, e.g. copper, nickel or nickel alloys.

The second material can e.g. be tin, lead, indium or alloys thereof (e.g. tin—lead).

In an assembly according to the invention, the studs can be used both for the mechanical strength of the means and for electrical connections. However, optionally, certain studs may only be used for mechanical strength purposes.

For those of the studs used for electrical connection purposes, the base will be formed on a connection track on the slider and the meltable stud member will be in contact with a similar connection track located beneath the spring arm.

The formation of the welding studs on the actual slider is particularly interesting in collective constructions of sliders.

The present invention also relates to a process for the production of a slider/spring arm assembly, the slider being in accordance with what was stated hereinbefore. According to the invention, this process comprises the following operations:

on a slider are formed bases from a first material having a first melting point, said bases having a controlled height, on each of the said bases is then formed a second meltable stud member from a second material having a second melting point below that of the first material, the spring arm is assembled on the slider in a position forming the working position of the assembly, the temperature of the studs is raised to above the second melting point of the second material, but below the first melting point of the first material.

In a special embodiment, in addition deposition takes place of third, supplementary multiple stud members on the end of the spring arm, said supplementary stud members being made from the second material and being placed at locations corresponding to the meltable studs deposited on the bases, said third supplementary stud members being welded to the first studs during the final operation.

DETAILED DESCRIPTION OF THE DRAWINGS

FIGS. 2a to 2h illustrate eight stages of a production process according to the invention.

Figure 2A:
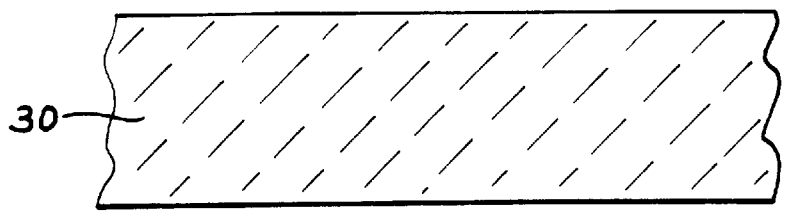
FIGS. 2a to 2h Show various stages of a process according to the invention.
Figure 2B:
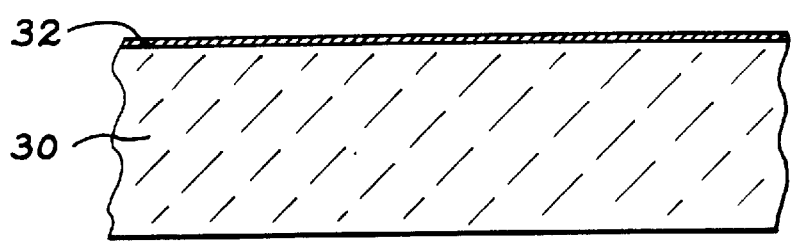

The starting product is a substrate 30, e.g. a silicon wafer, which will be used for forming the slider (FIG. 2a). On said substrate 30 is deposited a thin conductive coating 32 having a good adhesion, e.g. a chromium coating (FIG. 2b).

Figure 2C:
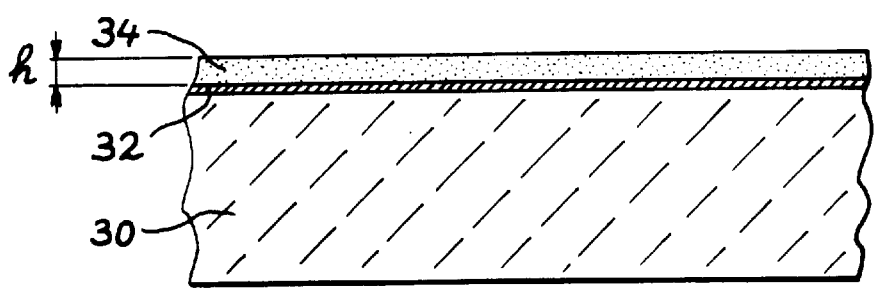

On said conductive coating 32 is then deposited a photosensitive film 34 having a thickness h equal to the minimum desired spacing between the slider and the end of the spring arm (FIG. 2c). This thickness can e.g. be 75 $\mu$m.

Figure 2D:
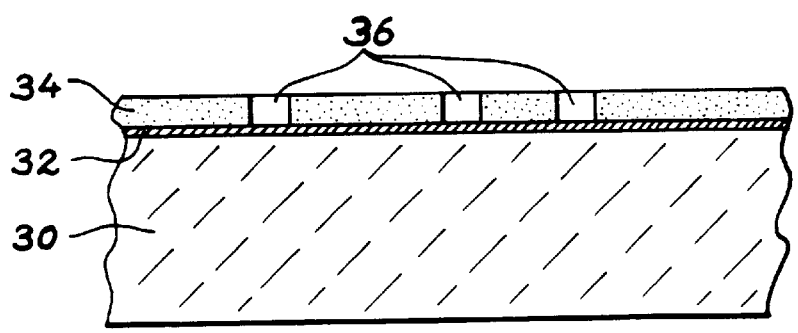

By photolithography of said film 34 openings 36 are formed at appropriate locations, with a diameter equal to the diameter of the bases which it is wished to produce (FIG. 2d). This diameter can vary between approximately 100 and 200 $\mu$m.

Figure 2E:
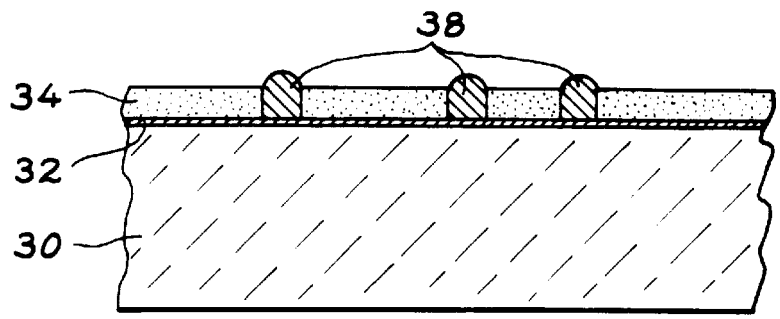

Conductive studs 38 are formed in said openings by electrolytic growth of a first conductive material, e.g. copper, while using the conductive coating 32 as the electrode (FIG. 2e).

Figure 2F:
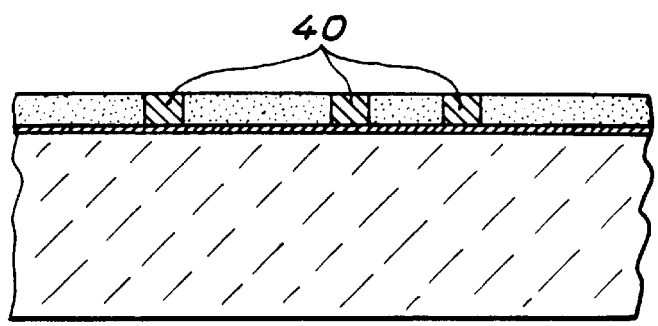

The studs obtained are planarized e.g. by a polishing method, in order to bring the metal level with the film 34, which provides the bases 40 (FIG. 2*f*).

Figure 2G:
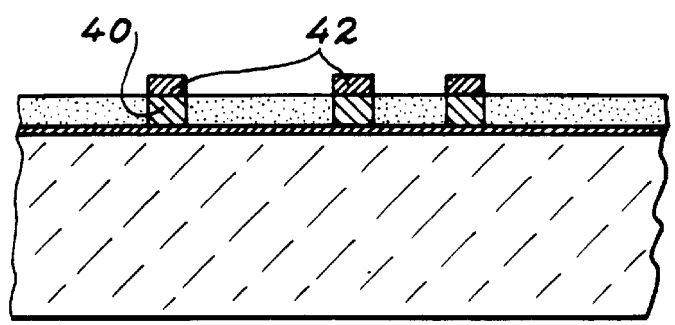
Figure 2H:
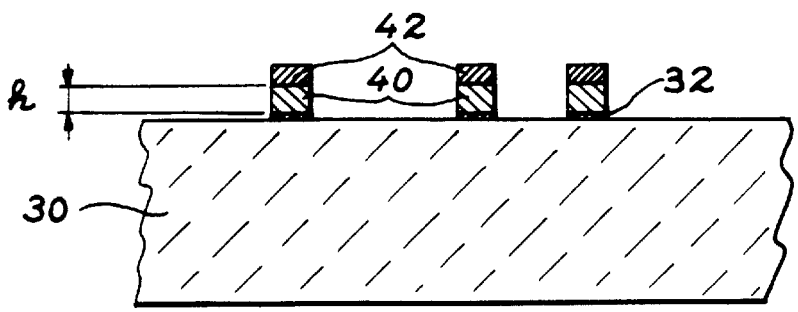

The meltable stud members 42 are formed by the electrolytic growth of a second material, such as tin-lead, on the bases 40 (FIG. 2*g*). The film 34 is then dissolved and the adhesion coating 32 is etched, so as to leave the composite studs 40–42 (FIG. 2*h*).

The process described hereinbefore assumes that the studs are produced by electrolytic growth. It would also be possible to proceed in another way, e.g. by etching and in this case there would be no need for the conductive adhesive coating 32.

Figure 1:
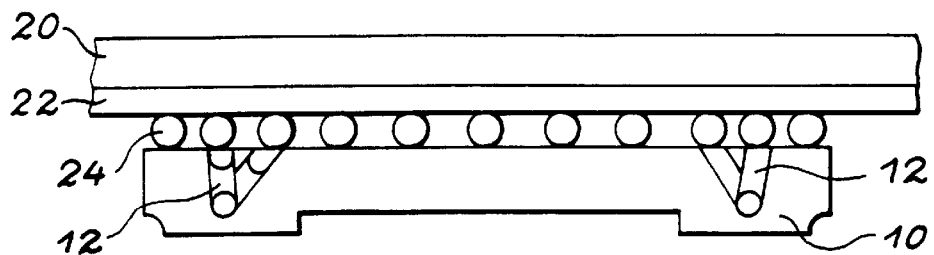
FIG. 1 Already described, shows a prior art assembly.
Figure 3:
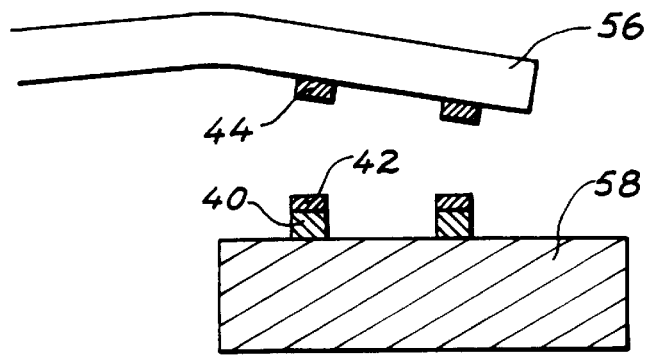
FIG. 3 Illustrates a variant where the meltable stud members are positioned both below the spring arm and on the slider.

In a possible embodiment illustrated in FIG. 3, not only are the studs 40–42 deposited on a slider 58, but also supplementary meltable stud members 44 are placed beneath the spring arm 56. These stud members 44 can be of the same material as the meltable studs 42, e.g. tin-lead. These supplementary stud members are positioned facing the meltable stud members 42 located at the top of the bases 40 on the slider.

Figure 4:
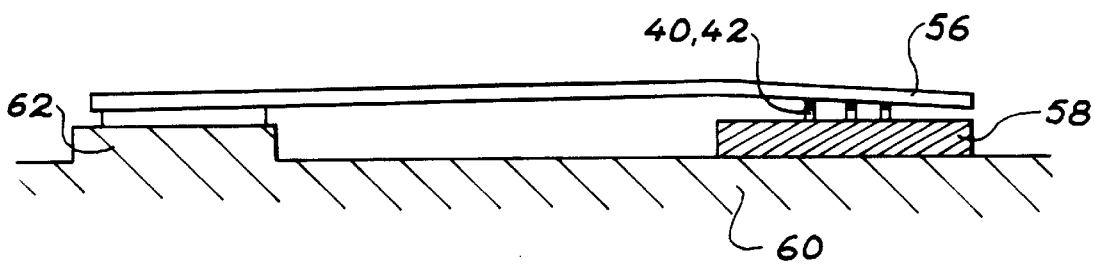
FIG. 4 Diagrammatically illustrates the installation of the slider beneath the spring arm.

The assembly of the slider beneath the end of the spring arm preferably takes place in accordance with FIG. 4.

The slider 58 is held on a reference plane 60, e.g. by suction. The spring arm 56 is held on a pedestal 62 integral with the reference plane 60. This pedestal 62 represents the base or foot of the spring arm in a final assembly. Thus, the arm is placed in the very position which it will occupy in operation.

The relative positioning of the slider with respect to the spring arm takes place either manually under the microscope, or automatically using optical detection. In this position, the arm exerts a force on the welding studs 40, 42.

Using a laser beam, infrared heating means, or any other appropriate means, the temperature of the welding studs is raised to above the melting point of stud members 42 (and if appropriate the supplementary stud members 44).

In practice, with the materials conventionally used (tin, tin-lead), the temperature is raised to the range 150 to 250° C. The meltable stud members melt and are crushed to a greater or lesser extent as a function of the position and dimensions of the different parts.

Thus, even if the spring arm is not perfectly parallel to the plane of the slider (which frequently occurs), the minimum spacing between the spring and the slider will be equal to the thickness of the copper studs 40, the tin thickness including the height differences due to the poor twisting of the spring. Thus, when the assembly is installed on the recording disk, the spring will have retained its slight bias shape, but the plane of the slider will be perfectly parallel to that of the foot of the spring.

What is claimed is:

1. A process for the production of a slider/spring arm assembly, the process comprising the steps of:

forming bases on a slider from a first material having a first melting point, said bases having a controlled height;

forming a meltable stud member on each of the said bases from a second material having a second melting point below that of the first material;

placing supplementary meltable stud members on an end of a spring arm, said supplementary stud members being made from the second material and being placed at locations corresponding to the meltable stud members deposited on the bases;

positioning a spring arm on the slider in a position which forms a working position of the assembly; and raising a temperature of the bases and meltable stud members to above the second melting point of the second material, but below the first melting point of the first material.

2. A process according to claim 1, wherein at least one of the bases is formed on a connection track deposited on the slider facing a connection track deposited on the spring arm.

3. A process according to claim 1, wherein the bases are produced by the following steps:

depositing a thin conductive coating on a substrate;

depositing a photosensitive film on said conductive coating, said photosensitive film having a thickness equal to a minimum desired spacing between the slider and an end of the spring arm;

forming openings in said film at appropriate locations;

forming conductive studs in said openings by electrolytic growth of the first material, the conductive coating serving as the electrode; and planarizing the studs obtained in order to obtain the bases.

4. A process according to claim 3, wherein the meltable stud members are formed by electrolytic growth of the second material on the bases.

* * * * *